(12) United States Patent
Hasegawa (10) Patent No.: US 6,704,448 B1
(45) Date of Patent: Mar. 9, 2004

(54) DEVICE AND METHOD FOR EXTRACTING SPECIFIC REGION FROM IMAGE AND COMPUTER-READABLE RECORDING MEDIUM STORING REGION EXTRACTION PROGRAM

(75) Inventor: Hiromu Hasegawa, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/572,870

(22) Filed: May 18, 2000

(30) Foreign Application Priority Data

May 27, 1999 (JP) .......................................... 11-148309

(51) Int. Cl.[7] .......................... G06K 9/34; G06K 9/46; G06K 9/00
(52) U.S. Cl. ..................... 382/173; 382/192; 382/118; 382/164
(58) Field of Search ................................ 382/173, 192, 382/179, 205, 117, 118, 194, 164, 181, 190, 162, 143, 232, 250

(56) References Cited

U.S. PATENT DOCUMENTS

| | | | | |
|---|---|---|---|---|
| 4,944,023 A | * | 7/1990 | Imao et al. .................. | 382/240 |
| 5,014,198 A | * | 5/1991 | Umemura ................... | 382/232 |
| 5,430,809 A | * | 7/1995 | Tomitaka .................... | 382/173 |
| 5,764,807 A | * | 6/1998 | Pearlman et al. ........... | 382/240 |
| 6,404,936 B1 | * | 6/2002 | Katayama et al. .......... | 382/283 |

FOREIGN PATENT DOCUMENTS

EP 0 756 426 1/1997 ............ H04N/9/64

OTHER PUBLICATIONS

"A knowledge–based System Controlled by an Iterative Quadtree Splitting Scheme for Segmentation of Seismic Sections," Zhe Zhang et al, IEEE Trans. On Geoscience and Remote Sensing, vol. 26, No. 5, Sep. 1988, pp. 518–524.*

* cited by examiner

Primary Examiner—Wenpeng Chen
(74) Attorney, Agent, or Firm—McDermott, Will & Emery (57) ABSTRACT

A region extraction device includes a segmentation unit for dividing an input image into a plurality of regions, a pixel number counting unit for determining the ratio of pixels of a predetermined value to all pixels of each of the plurality of regions, and a region extracting unit for extracting a region in which the ratio determined by the pixel number counting unit exceeds a first value. Among the plurality of regions into which the input image is divided, a region is extracted in which the ratio determined by the pixel number counting unit exceeds the first value, so that a specific region can be extracted accurately even if the values of pixels in the specific region to be extracted are scattered in a wide range.

9 Claims, 10 Drawing Sheets

DEVICE AND METHOD FOR EXTRACTING SPECIFIC REGION FROM IMAGE AND COMPUTER-READABLE RECORDING MEDIUM STORING REGION EXTRACTION PROGRAM

This application is based on application No. 11-148309 filed in Japan, the content of which is hereby incorporated by reference.

BACKGROUND OF THE INVENTION

1. Field of the Invention

The present invention relates to a region extraction device, a region extraction method, and a recording medium on which a region extraction program is recorded. In particular, the invention relates to a region extraction device and a region extraction method for extracting from an image a region of a specific part such as face, hand, hair, lips and the like of a person, and relates to a recording medium on which a region extraction program for extracting such a region is recorded.

2. Description of the Related Art

Studies have heretofore been conducted to extract only the face region of a person included in an image. European Patent No. 756426 discloses an art of extracting a face area of a person included in an image. According to this art, a hue value is calculated from an input image signal, the number of pixels having the derived hue value is counted to determine the skin color of the person in the image, pixels having the determined hue value are extracted, and accordingly the face area of the person is extracted. More specifically, hue value H is calculated for each pixel by using equation (1) below from an input image signal. Pixels included in the image signal include three data, i.e., R (red), G (green) and B (blue).

$$H = \cos^{-1}\left[\frac{(R-G)+(R-B)}{2\sqrt{((R-G)^2+(R-B)(G-B))}}\right] \quad (H = 2\pi - H, \text{ if } B > G) \quad (1)$$

Then, the number of pixels having hue value H included in a predetermined range is counted. The ratio of the face area to the input image signal is considered, and accordingly the skin color of the person included in the image signal is determined. Based on the determined skin color, a range of the hue value is specified. Pixels having hue values which fall within the specified range of the hue value are extracted from the input image signal. The face area of the person is thus extracted from the input image signal.

According to the art disclosed in EP 756426, pixels having hue values in a predetermined range are extracted so as to extract from an image a specified area representing a face. Therefore, if the hues of the specified area are distributed over a certain range due to influences of shade and the like on the face, the specified area cannot be extracted accurately. Especially, the outline of the face is likely to be shaded which causes the outline not to be extracted. In this case, the outline of the face cannot be specified from the extracted image.

Although the range of the extracted hue values can be expanded until the range encompasses a range of hues distributed in the specified area in order to extract the specified area, a background area having hues similar to the hues of the face is also extracted disadvantageously.

SUMMARY OF THE INVENTION

The present invention is made to solve the problem above. One object of the invention is to provide a region extraction device and a region extraction method capable of accurately extracting a specific region in an image even if pixel values in the specific region to be extracted are scattered in a wide range, and a computer-readable recording medium on which a region extraction program for allowing a computer to extract a specific region is recorded.

In order to achieve the object above, according to one aspect of the invention, a region extraction device includes a segmentation unit to divide an input image into a plurality of regions, a calculation unit to determine a ratio of pixels of a predetermined value to all pixels of each of the plurality of regions, and an extraction unit to extract a region in which the ratio determined by the calculation unit exceeds a first value.

According to another aspect of the invention, a region extraction method includes the steps of dividing an input image into a plurality of regions, determining a ratio of pixels of a predetermined value to all pixels of each of the plurality of regions, and extracting a region in which the ratio determined in the determining step exceeds a first value.

According to still another aspect of the invention, a computer-readable recording medium has a region extraction program recorded thereon, the region extraction program allowing a computer to execute the steps of dividing an input image into a plurality of regions, determining a ratio of pixels of a predetermined value to all pixels of each of the plurality of regions, and extracting a region in which the ratio determined in the determining step exceeds a predetermined value.

According to this invention, it is possible to provide a device and a method capable of accurately extracting a specific region in an image even if pixel values in the specific region to be extracted are scattered in a wide range, and provide a computer-readable recording medium on which a region extraction program for allowing a computer to extract a specific region is recorded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are described below in conjunction with the drawings. Like reference characters represent like or corresponding components.

First Embodiment

Figure 1:
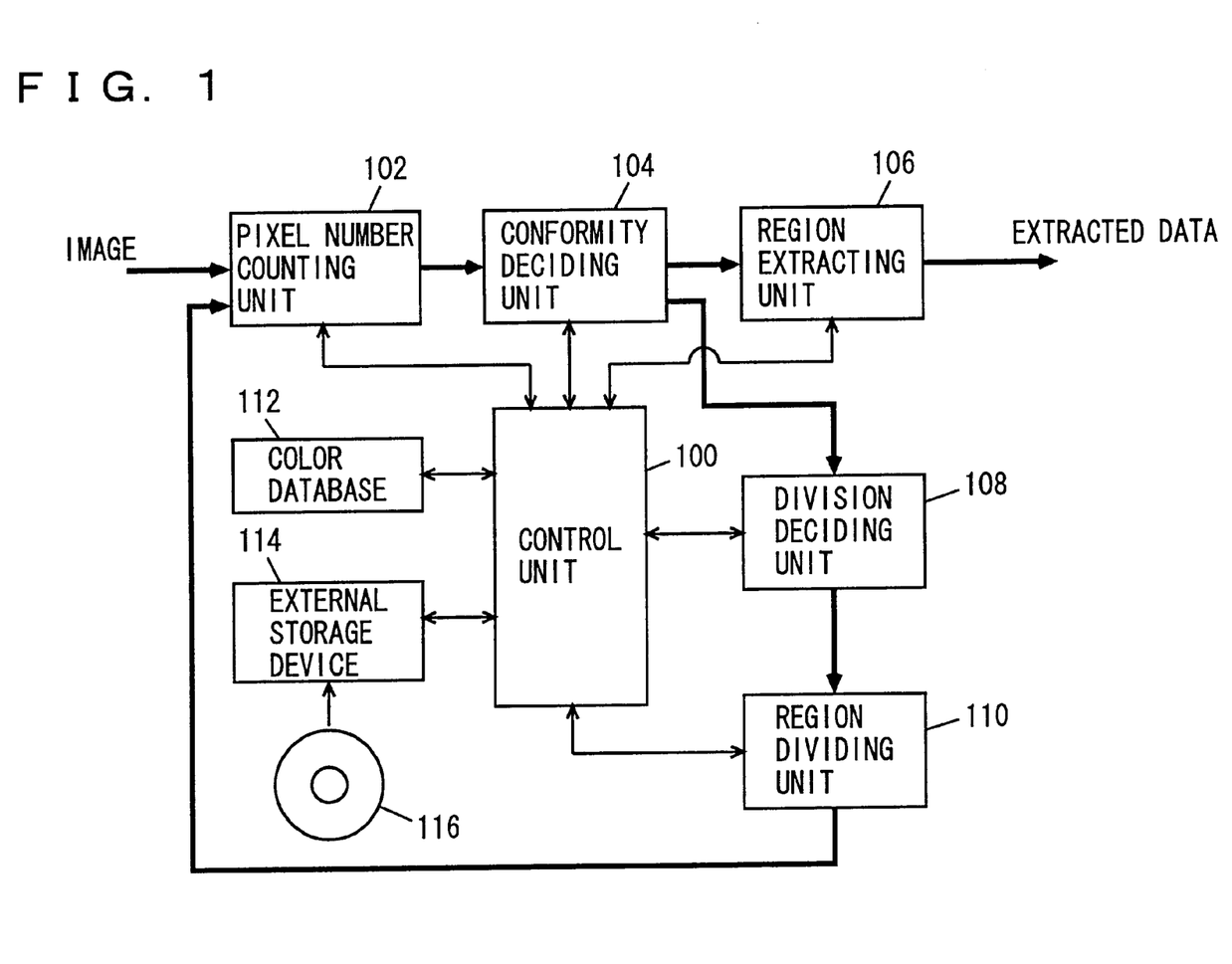
FIG. 1 is a block diagram showing a hardware structure of an image processing device in a first embodiment of the invention.

FIG. 1 is a block diagram showing a hardware structure of an image processing device to which a region extraction device of the present invention is applied. Referring to FIG. 1, the image processing device includes a control unit 100 for controlling the entire image processing device, a color database 112 for storing a plurality of sets of R, G and B values representing a skin color, a pixel number counting unit 102 for counting the number of pixels having a predetermined pixel value included in an input image or in a region resultant from division by a region dividing unit 110, a conformity deciding unit 104 for deciding whether the region with pixels counted by pixel number counting unit 102 conforms to a condition for extracting the region, a region extracting unit 106 for extracting a region satisfying the region extracting condition according to the decision by conformity deciding unit 104, a division deciding unit 108 for deciding whether a region should be divided which does not satisfy the region extracting condition according to the decision by conformity deciding unit 104, and region dividing unit 110 for dividing a region which needs dividing according to the decision by division deciding unit 108, the division performed by a quad tree image segmentation method. It is noted that the bold line and thin line in FIG. 1 represent the flow of data and the flow of a control signal respectively.

Pixel number counting unit 102 counts the number of pixels included in an input image which have RGB values identical to those stored in color database 112. The image input to pixel number counting unit 102 is an image which is supplied first to the image processing device, or a region which is one of four regions into which a region is divided by region dividing unit 110 as described later. An image input to pixel number counting unit 102 is hereinafter referred to as a process image for the purpose of description. The process image has a plurality of pixels and each pixel has three values of R, G and B.

Color database 112 stores a plurality of sets of three values, i.e., R, G and B values. The stored sets are each a combination of R, G and B values which represent a skin color. Skin colors are different in the hue, as a fair complexion and a dark complexion. A plurality of combinations of three R, G and B values are selected and stored in consideration of the difference of the hue.

Conformity deciding unit 104 decides whether the process image includes a sufficient number of pixels having a hue to be extracted. This decision is based on whether a hue occupation ratio exceeds a predetermined threshold. The hue occupation ratio is a ratio of the number of pixels counted by pixel number counting unit 102 to the number of pixels included in the process image.

Region extracting unit 106 extracts a process image including a sufficient number of pixels having the hue to be extracted, which is decided by conformity deciding unit 104. Extracted data consists of the process image and the position and size of the extracted image relative to an image input to the image processing device.

Division deciding unit 108 decides whether a process image, which does not include a sufficient number of pixels having the hue to be extracted as decided by conformity deciding unit 104, needs further division. Specifically, the decision is made as to whether a process image is smaller than a predetermined size or the hue occupation ratio determined by conformity deciding unit 104 is smaller than a predetermined value.

Region dividing unit 110 divides a region which needs dividing as decided by division deciding unit 108 into four regions based on the quad tree image segmentation method. The four images of the regions are each input to pixel number counting unit 102 as a new process image.

Figure 2:
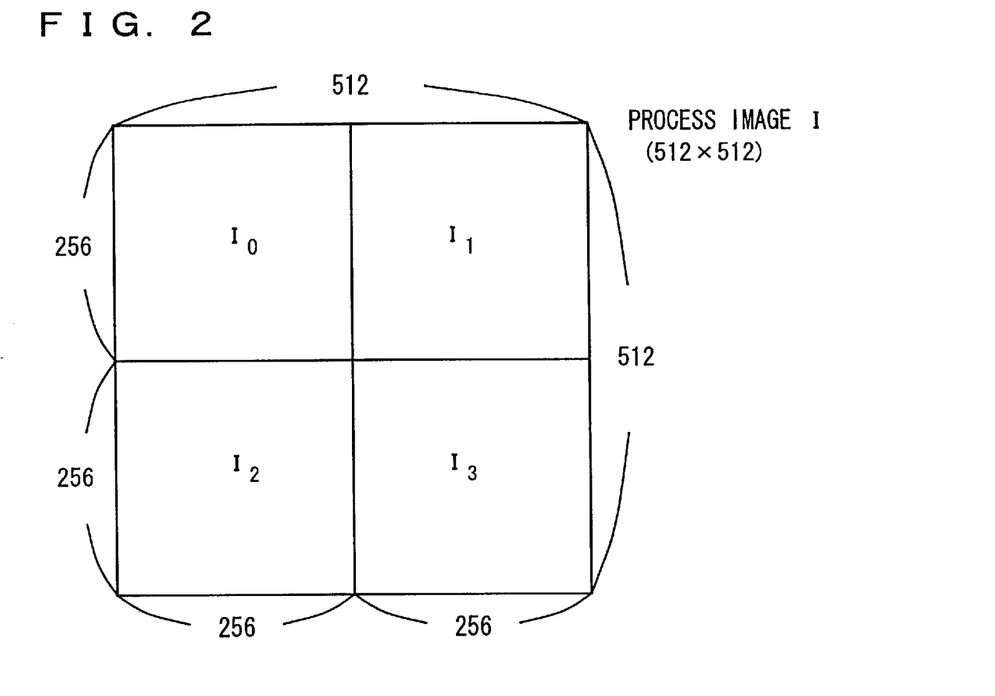
FIG. 2 illustrates segmentation of an image to be processed (referred to as process image).

The segmentation of a process image by region dividing unit 110 is described below. FIG. 2 illustrates segmentation of a process image. Referring to FIG. 2, process image I represents the image input first to the image processing device. Process image I consists of pixels of 512 pixels×512 lines. Segmentation of a process image means division of process image I into four regions. Specifically, if the position of each pixel in process image I is represented as I (i, j) (i=0, 1, ... 511; j=0, 1, ... 511), the four process images into which process image I is divided can be represented as follows.

(1) Process Image $I_0$ $I_0$ (i, j)(i=0, 1, ... 255; j=0, 1, ... 255)
(2) Process Image $I_1$ $I_1$ (i, j)(i=256,257, ... 511; j=0, 1, ... 255)
(3) Process Image $I_2$ $I_2$ (i, j)(i=0, 1, ... 255; j=256,257, ... 511)
(4) Process Image $I_3$ $I_3$ (i, j)(i=256,257, ... 511; j=256,257, ... 511)

Figure 3:
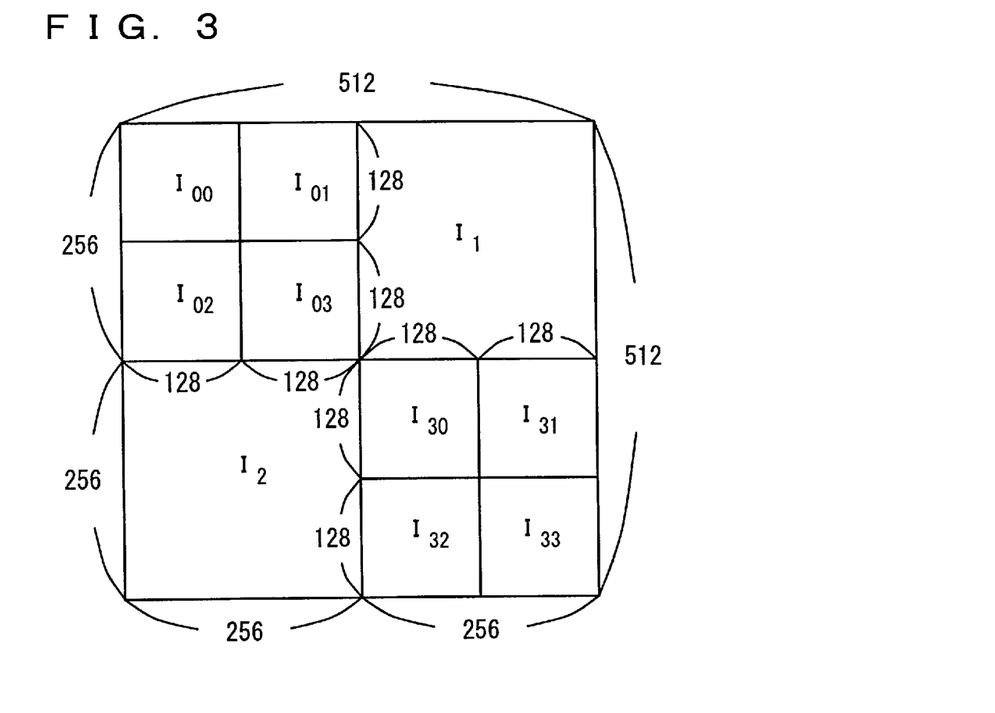
FIG. 3 illustrates segmentation of process images Io and I in FIG. 2.

FIG. 3 illustrates segmentation of process images $I_0$ and $I_3$. Process image $I_0$ is further divided into four process images $I_{00}$, $I_{01}$, $I_{02}$ and $I_{03}$. Similarly, process image $I_3$ is divided into four process images $I_{30}$, $I_{31}$, $I_{32}$ and $I_{33}$.

Four process images $I_{00}$, $I_{01}$, $I_{02}$ and $I_{03}$ into which process image $I_0$ is divided are represented as follows.
(1) Process Image $I_{00}$ $I_{00}$ (i, j) (i=0, 1, ... 127; j=0, 1, ... 127)
(2) Process Image $I_{01}$ $I_{01}$ (i, j) (i=128, 129, ... 255; j=0, 1, ... 127)
(3) Process Image $I_{02}$ $I_{02}$ (i, j) (i=0, 1, ... 127; j=128, 129, ... 255)
(4) Process Image $I_{03}$ $I_{03}$ (i, j) (i=128, 129, ... 255; j=128, 129, ... 255)

Four process images $I_{30}$, $I_{31}$, $I_{32}$ and $I_{33}$ into which process image $I_3$ is divided can be represented similarly.

In this way, region dividing unit 110 divides a process image according to the quad tree segmentation.

Referring again to FIG. 1, control unit 100 is connected to an external storage device 114. The external storage device 114 is a driver for reading a program and data stored on a recording medium 116 such as optical magnetic disk and digital video disk (DVD). The external storage device 114 can also read image data stored on recording medium 116. Further, the external storage device 114 can write data extracted by region extracting unit 106 onto recording medium 116.

Alternatively, a program for execution of processing by pixel counting unit 102, conformity deciding unit 104, region extracting unit 106, division deciding unit 108 and region dividing unit 110 may be recorded on recording medium 116 and the recorded program may be read by external storage device 114 in order to execute the processing by control unit 100. In this case, pixel counting unit 102, conformity deciding unit 104, region extracting unit 106, division deciding unit 108 and region dividing unit 110 are unnecessary.

Figure 4:
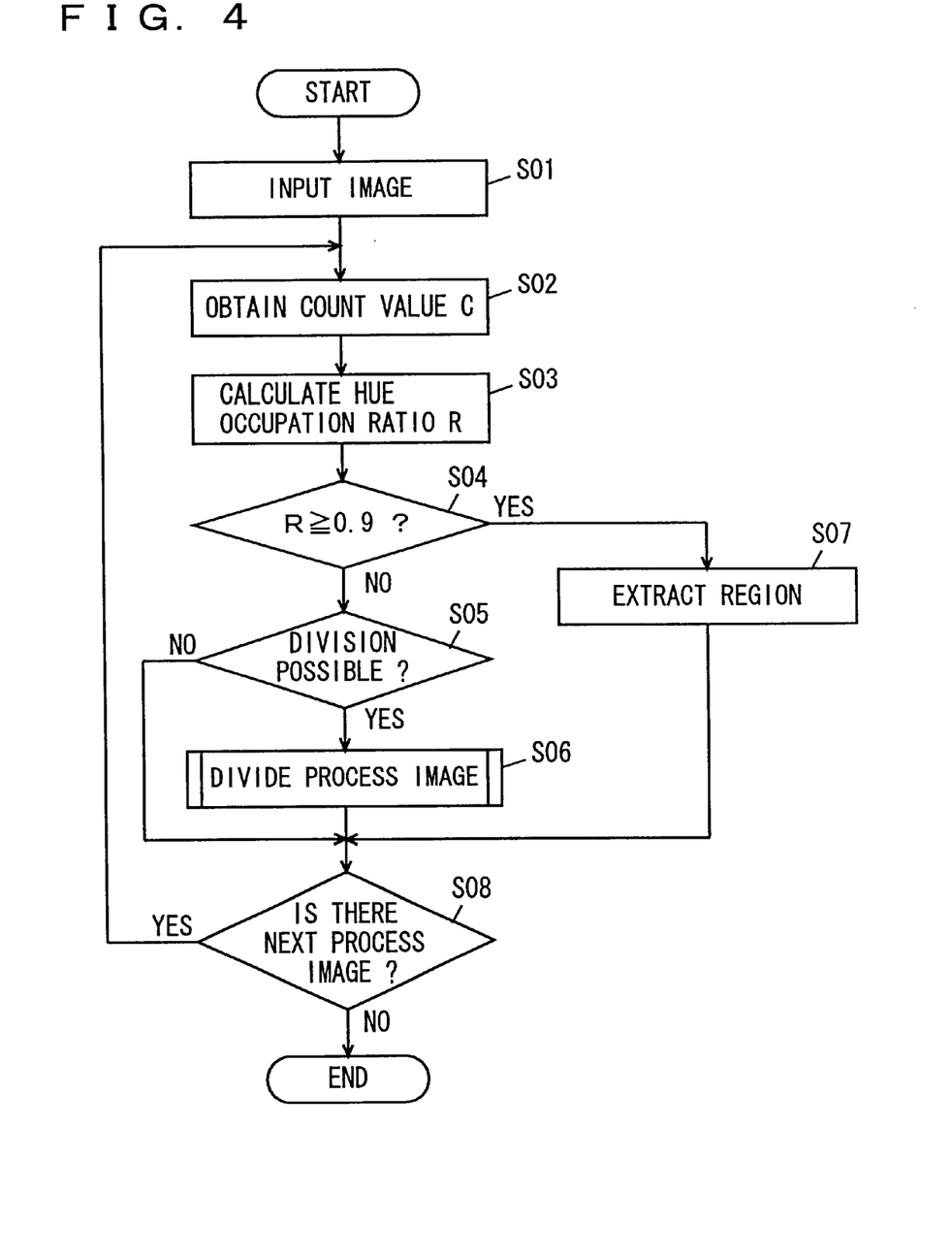
FIG. 4 is a flowchart showing a flow of a region extracting process.

Flow of processing performed by the image processing device is described now in detail. FIG. 4 is a flowchart illustrating a flow of a region extracting process done by the image processing device. Referring to FIG. 4, an image to be processed is input to the image processing device (S01). The input image has a resolution of 512 pixels×512 lines and each pixel has R, G and B values each quantized into 8-bit. The input image is supplied as a process image to pixel number counting unit 102.

Pixel number counting unit 102 then counts the number of pixels, among the pixels of the process image, having a set of three R, G and B values which corresponds to the set thereof stored in color database 112 (S02). A plurality of sets of three R, G and B values corresponding to the hue to be extracted, that is, the hue in the category of skin color in this embodiment are registered in color database 112. Pixel number counting unit 102 reads the sets of three R, G and B values stored in color database 112, and compares them with values of all pixels in the process image. Pixel number counting unit 102 then counts the number of pixels having values identical to the R, G and B values of the sets stored in color database 112 and accordingly count value C is determined.

Following this, hue occupation ratio R of process image I is calculated (S03). Hue occupation ratio R is calculated based on count value C determined in step S02 and the total number of pixels N in the whole process image, according to an equation, R=C/N.

Next, it is determined whether thus calculated hue occupation ratio R is equal to or greater than a threshold (0.9) (S04). If hue occupation ratio R is at least the threshold, this flow proceeds to step S07, or to step S05 if not.

In step S07, the process image is extracted. If the hue occupation ratio is determined to be equal to or greater than the threshold in step S04, it means that the process image includes a sufficient number of pixels having the hue to be extracted. In other words, the process image is regarded as a region of the skin color.

On the other hand, if it is determined that the hue occupation ratio is smaller than the threshold (NO in step S04), decision is made as to whether or not the process image should be divided (S05). The division decision process in step S05 is discussed later in detail.

If it is decided that the image needs dividing in step S05, this flow proceeds to step S06, or step S08 if not. In step S06, the process image is divided as described above.

After the region is extracted, or if the decision in step S05 indicates that division is unnecessary, or if the process image is divided in step S06, step S08 is performed in which determination is made as to whether there is a process image to be processed next. If there is a process image to be processed subsequently, the image undergoes steps S02 to S07. If there is no process image to be processed next, the processing in this flow is completed. The process image here includes process images into which the image is divided in step S06. For example, if process image I is divided in step S06, the resultant four process images $I_0$, $I_1$, $I_2$ and $I_3$ each undergo steps S02 to S07.

Figure 5:
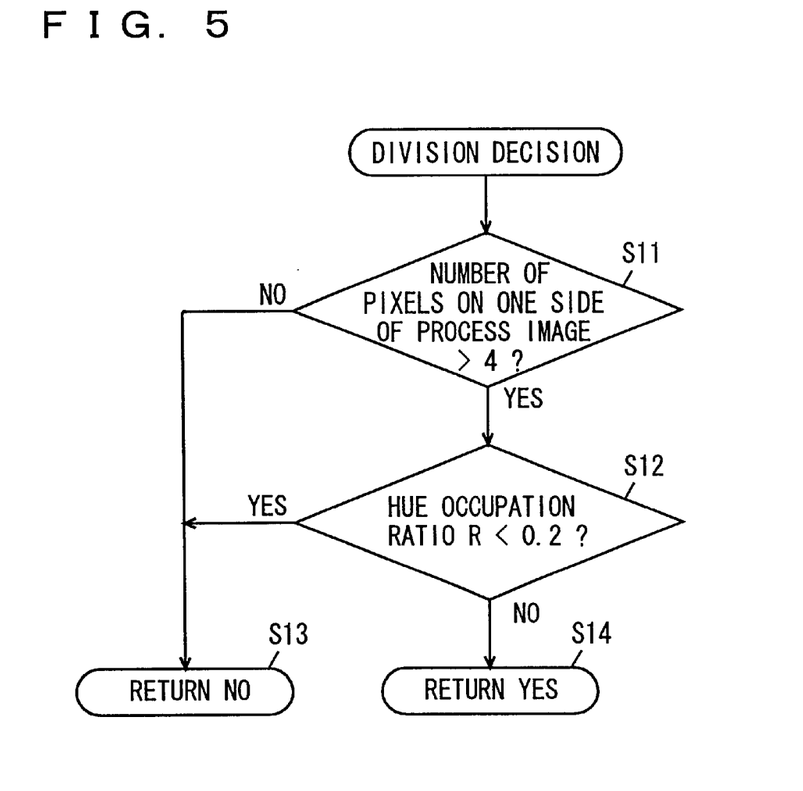
FIG. 5 is a flowchart showing a flow of a segmentation determining process in step S05 in FIG. 4.

The following description is about the division decision process in step S05 in FIG. 4. FIG. 5 is a flowchart illustrating a flow of the division decision process in step S05 in FIG. 4. Referring to FIG. 5, in step S11, whether the number of pixels on one side of the process image is greater than 4 is decided, in order to divide the process image in step S06 in FIG. 4 until the number of pixels on one side of a process image becomes equal to 4. Accordingly, the processing speed can be enhanced without dividing the process image into images each corresponding to a pixel. Another reason for the decision in step S11 is that a region with approximately 4 pixels on one side is enough to be extracted in the region extracting process by the image processing device according to this embodiment.

If the number of pixels on one side of the process image is decided to be greater than 4, step S12 is conducted. If not, step S13 is performed.

In step S12, it is decided whether hue occupation ratio R is smaller than a threshold (0.2), in order not to extract a process image that has almost no pixel of the hue to be extracted, even if the number of pixels on one side of the process image is greater than 4. Then, needless decision is not made and the processing speed can be increased accordingly. It is noted that the threshold may be 0.0. In this case, the result in step S12 is always "NO" and step S14 is conducted subsequently.

If it is determined that hue occupation ratio R is smaller than the threshold 0.2 in step S12, step S13 is conducted. If not, step S14 is conducted.

In step S13, "NO" is returned, and in step S14, "YES" is returned, to step S05 in FIG. 4.

Although whether a process image should be divided is decided on the basis of the two conditions, i.e. the size of the process image and hue occupation ratio R, according to this embodiment, any one of the conditions may be employed. For example, segmentation of a process image may be continued until the size of a process image becomes a predetermined size (4×4). Alternatively, the process image segmentation may be continued until hue occupation ratio R becomes equal to a predetermined threshold. If only the hue occupation ratio is used as the condition, a process image is divided until a resultant process image corresponds to a pixel, so that a specific region can be extracted in more detail.

Figure 6:
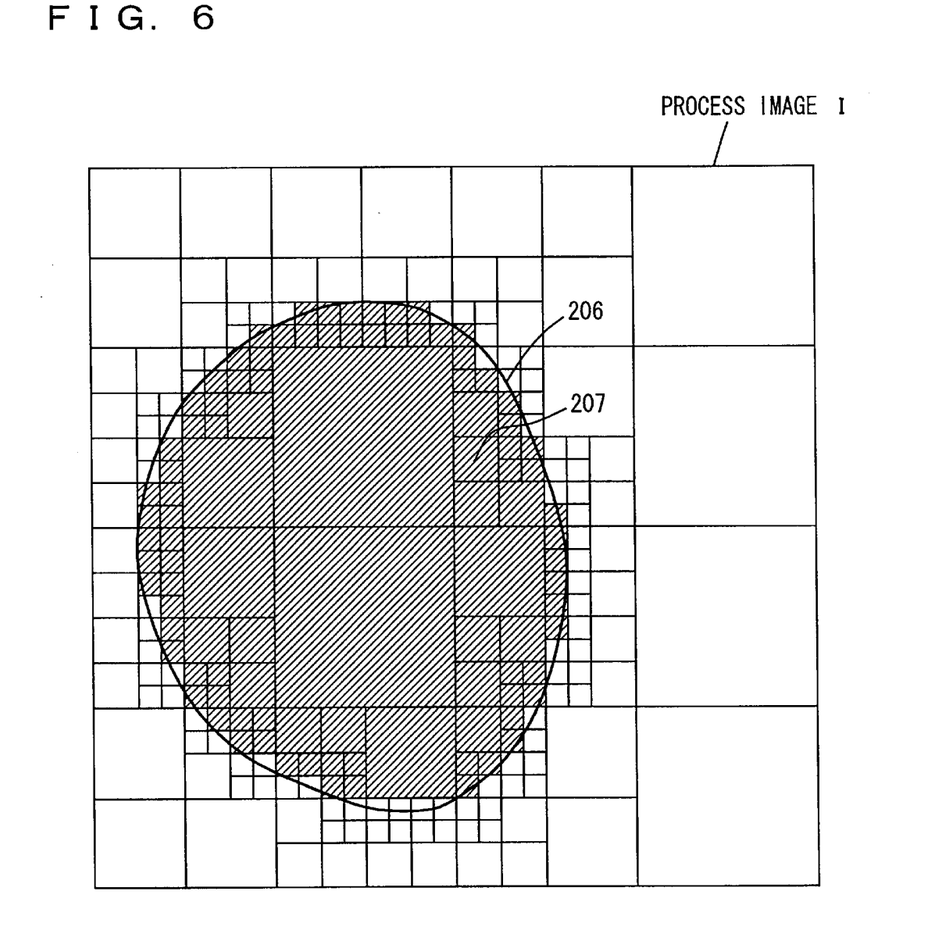
FIG. 6 is a first drawing illustrating one example of segmentation of a process image which has undergone the region extracting process.

FIG. 6 illustrates one example of a segmented process image in the region extracting process by the image processing device in this embodiment. Process image I which is first input to the image processing device includes a region 206 to be extracted. A region 207 which is extracted is hatched. The respective rectangles shown in FIG. 6 represent process images into which process image I is divided. At the central portion of region 206 to be extracted, process images are extracted having a large area. In the vicinity of the outline of region 206 to be extracted, process image I is divided into the minimum process images.

Figure 7:
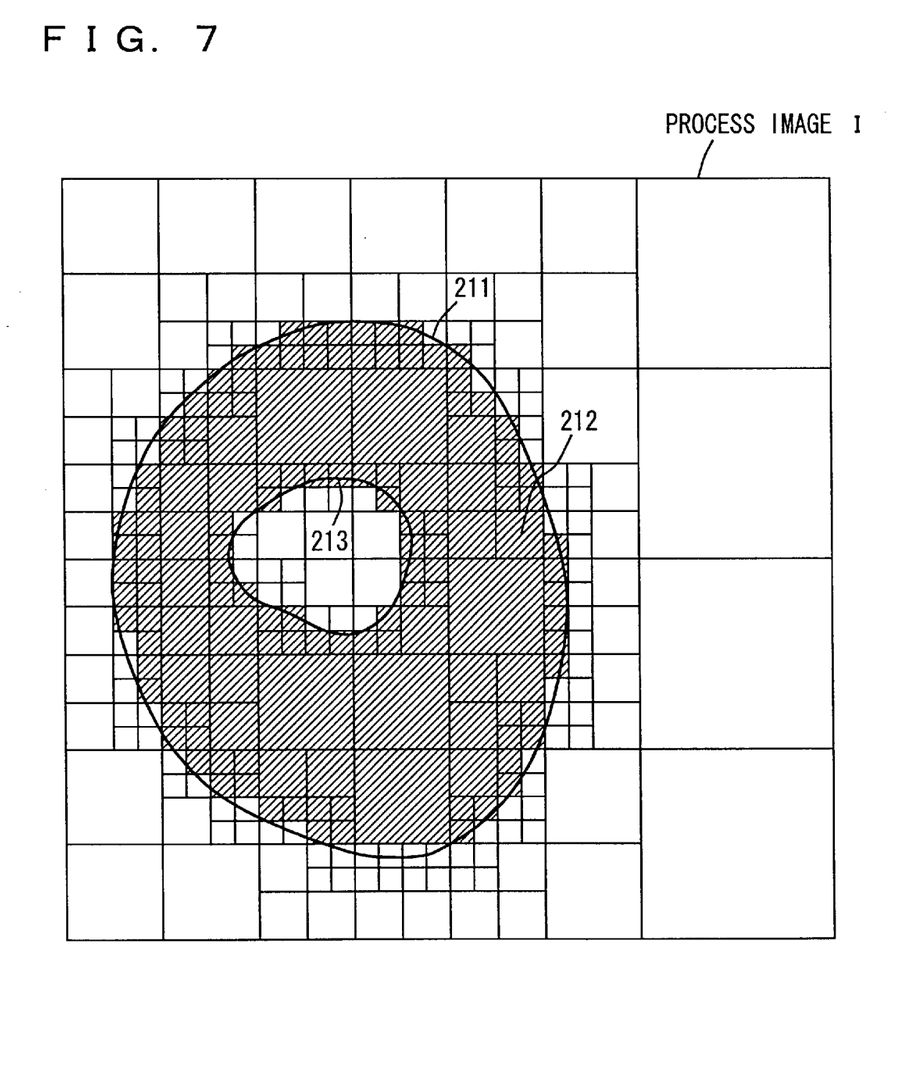
FIG. 7 is a second drawing illustrating one example of segmentation of a process image which has undergone the region extracting process.

FIG. 7 illustrates another example of a segmented process image in the region extracting process by the image processing device in this embodiment. Referring to FIG. 7, process image I which is first input to the image processing device includes a region 211 to be extracted. Region 211 to be extracted includes therein a region 213 not to be extracted. A Region 212 which is extracted is hatched. As apparent from FIG. 7, a large process image is extracted near the middle of the portion between the outer contour and the inner contour of region 211 to be extracted. In the vicinity of the outer and inner contour, process image I is divided into the minimum process images (4×4) and extracted.

Figure 8:
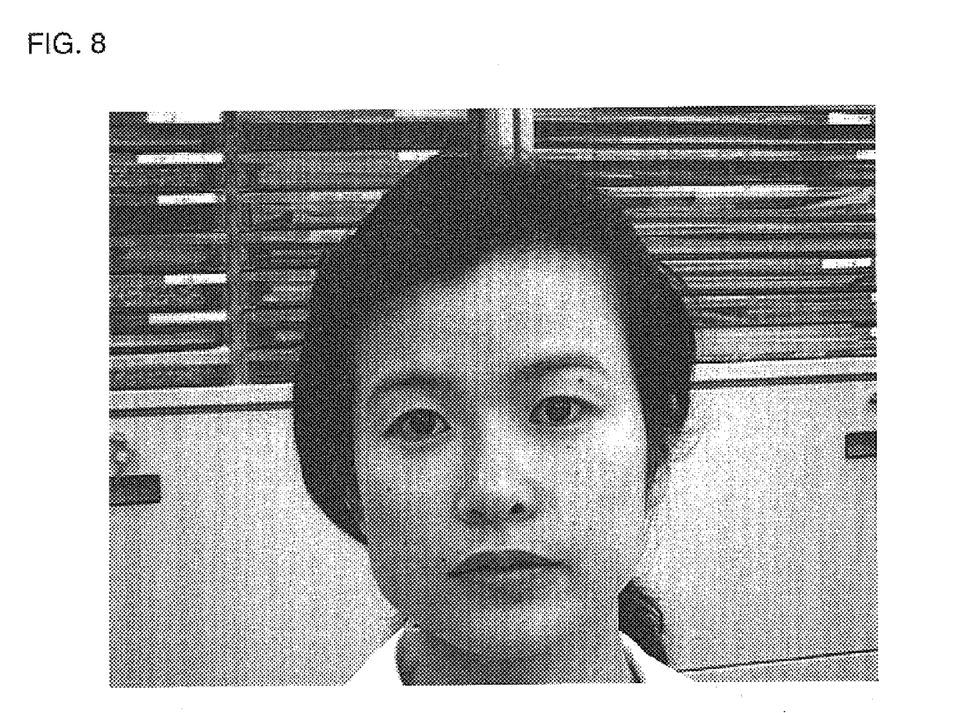
FIG. 8 shows one example of a process image which is input to the image processing device.
Figure 9:
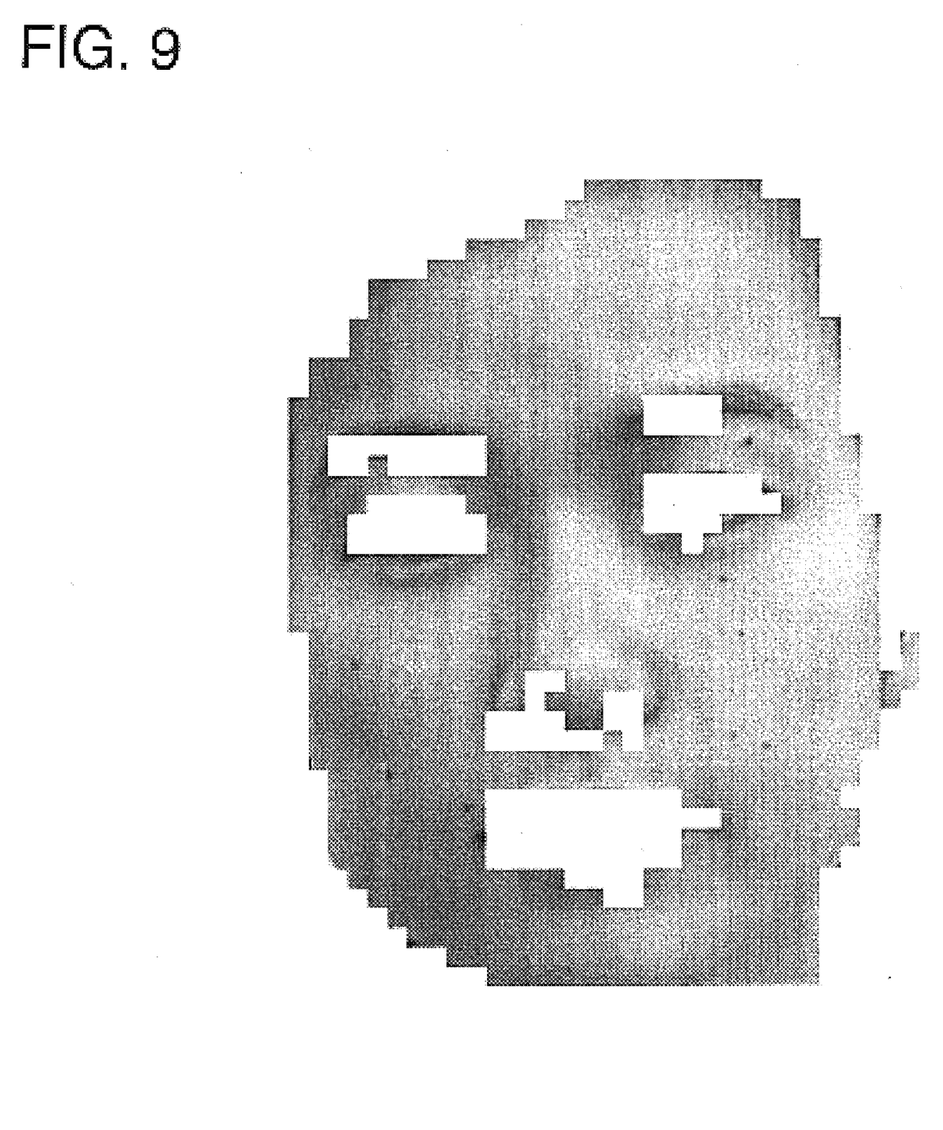
FIG. 9 illustrates a specific region extracted from the process image shown in FIG. 8.

FIGS. 8 and 9 illustrate one exemplary result of the region extracting process by the image processing device in this embodiment. FIG. 8 shows process image I input to the image processing device in this embodiment. FIG. 9 shows a specific region extracted from process image I in FIG. 8. FIG. 8 illustrates an image containing in its central portion the face of a person. Actually, process image I is a colored image including the person's face (forehead, nose, cheeks, jaw and the like) in the skin color, eyebrows, eyes and the like in black, and lips in red. As understood by comparison between FIGS. 8 and 9, the region of the skin color in process image I shown in FIG. 8, in other words, the face portion of the person is extracted, and regions of colors except the skin color such as eyebrows, eyes, lips and the like are not extracted. It is also seen that the extracted face portion in process image I includes the outline thereof.

As heretofore described, the image processing device in this embodiment extracts process images, among process images into which process image I is divided, which have the hue occupation ratio greater than a predetermined threshold as a specific region. Therefore, even if values of pixels in the specific region scatters in a wide range, the specific region can be extracted regardless of the scattering values.

In addition, the specific region can be extracted including its outline as far as possible by repeatedly dividing a process image into four regions in the vicinity of the boundary between the specific region and the non-specific region to gradually reduce the size of the process image.

Modification of Region Extracting Process

According to the embodiment above, the threshold value used for comparing hue occupation ratio R in step S04 in FIG. 4 and the threshold value used for comparing hue occupation ratio R in step S12 in FIG. 5 are fixed values. The threshold employed in step S04 in FIG. 4 represents the lower limit of hue occupation ratio R for extracting a process image, while the threshold employed in step S12 in FIG. 5 is the upper limit of hue occupation ratio R for determining that a process image is not to be extracted. According to a modified region extracting process, these threshold values are varied depending on the size of a process image. An example of the threshold values are shown below.

Suppose that the number of pixels on one side of a process image is D, a threshold value used in step S04 in FIG. 4 is T1 and a threshold value used in step S12 in FIG. 5 is T2, size D of the process image and thresholds T1 and T2 can be set as follows.

(1) D=512, then T1=0.75, T2=0.05
(2) D=256, then T1=0.8, T2=0.05
(3) D=128, then T1=0.8, T2=0.075
(4) D=64, then T1=0.8, T2=0.075
(5) D=32, then T1=0.85, T2=0.1
(6) D=16, then T1=0.85, T2=0.1
(7) D=8, then T1=0.9, T2=0.15
(8) D=4, then T1=0.9, T2=0.2
(9) D=2, then T1=1.0, T2=0.25
(10) D=1, then T1=1.0, T2=0.5

In this way, threshold values T1 and T2 are changed according to the size of a process image in order to use them as parameters for determining if a process image of a certain size should be extracted. Consequently, detailed information on local areas of an image can be considered in making the determination, and thus a specific region can more accurately be extracted.

According to this embodiment described above, image signals are three R, G and B signals which are used for an image input to the image processing device or used in color database 112. However, except for these signals, luminance signal Y and two color-difference signals Cb and Cr may be used, or Y, I, and Q signals, or Y, U and V signals, or signals converted onto H, V and C axes in a uniform visually-perceived space such as Munsell space may be used.

In addition, although all of the three R, G and B signals are employed above, the extracting process may use only one of or a combination of two signals of the three signals. This is similarly applied to Y, Cb and Cr signals, Y, I and Q signals, Y, U and V signals and signals converted onto H, V and C axes.

Further, although a specific region having the hue of the skin color is extracted from an image in this embodiment, a region of red flowers and green leaves for example can be extracted from an image, by changing hues registered in color database 112.

Second Embodiment

An image processing device is described below to which a region extracting device in the second embodiment is applied. The image processing device in the first embodiment extracts a region having a large number of pixels of the hue to be extracted, while the image processing device in the second embodiment extracts a region including a large number of edge portions included in an image.

Figure 10:
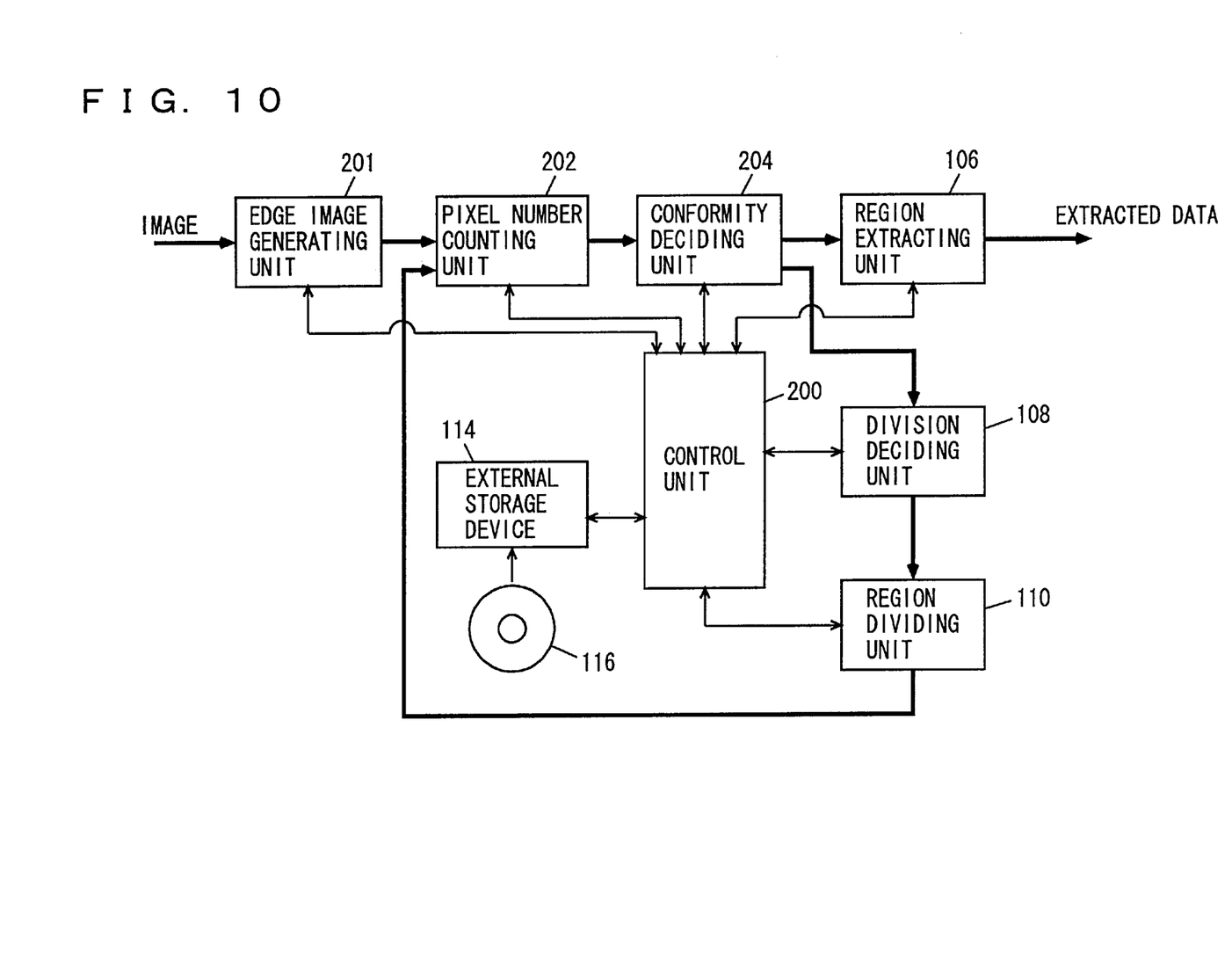
FIG. 10 is a block diagram showing a hardware structure of an image processing device in a second embodiment.

FIG. 10 is a block diagram showing a hardware structure of the image processing device in the second embodiment. Referring to FIG. 10, the image processing device includes an edge image generating unit 201 for generating an edge image from an input image, a pixel number counting unit 202 for counting the number of edge pixels included in an image input to the image processing device, or included in an image which is one of images into which an image is divided by a region dividing unit 110 (these images are hereinafter referred to as process image), a conformity deciding unit 204 for deciding whether the process image conforms to a condition for extracting the image, a region extracting unit 106 for extracting a process image which satisfies the extracting condition according to the decision by conformity deciding unit 204, a division deciding unit 108 for deciding whether a process image should be divided which does not satisfy the extracting condition according to the decision by conformity deciding unit 204, and region dividing unit 110 for dividing a region which needs dividing according to the decision by the division deciding unit 108 into four process images based on quad tree image segmentation method.

Figure 11:
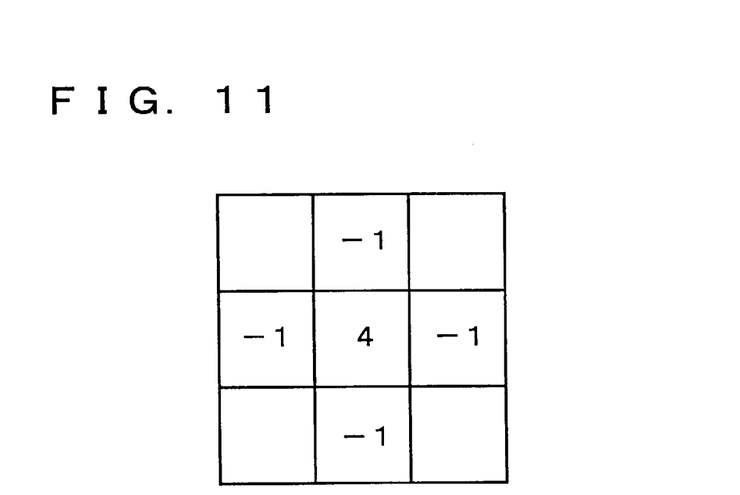
FIG. 11 shows one example of a differential filter.

Edge image generating unit 201 extracts a pixel forming an edge in an input image. The edge pixel is extracted by using a differential filter, for example. FIG. 11 shows one example of the differential filter used by edge image generating unit 201. Referring to FIG. 11, the differential filter is formed of a matrix of 3×3 including a pixel to be processed (observation pixel) and four pixels neighboring vertically and horizontally, and pixel values of the observation pixel and four neighboring pixels are used. Specifically, suppose that the pixel value of the observation pixel is X and values of the four neighboring pixels are Y1, Y2, Y3 and Y4 respectively, differential value Z of the observation pixel is represented as Z=4×X−(Y1+Y2+Y3+Y4).

From the image differentiated by using the differential filter, a pixel having its differential value greater than a predetermined threshold is extracted as an edge pixel.

Pixel number counting unit 202 counts the number of edge pixels included in the process image. The edge pixels have been determined by edge image generating unit 201. The process image is an image which is first input to the image processing device or one of images into which an image is divided by region dividing unit 110.

Conformity deciding unit 204 decides whether the process image is a region to be extracted based on the ratio of the edge pixels to all pixels of the process image (the ratio is hereinafter referred to as edge occupation ratio).

Region extracting unit 106 extracts a process image which should be extracted according to the decision by conformity deciding unit 204, and outputs data on the position and size of the process image as extracted data.

Division deciding unit 108 decides whether or not a process image, which should not be extracted according to the decision by conformity deciding unit 204, needs dividing, based on the size of the process image.

Region dividing unit 110 divides a process image, which needs dividing according to the decision by division deciding unit 108, into four process images according to quad tree image segmentation method. Resultant process images are transmitted to pixel number counting unit 202.

Figure 12:
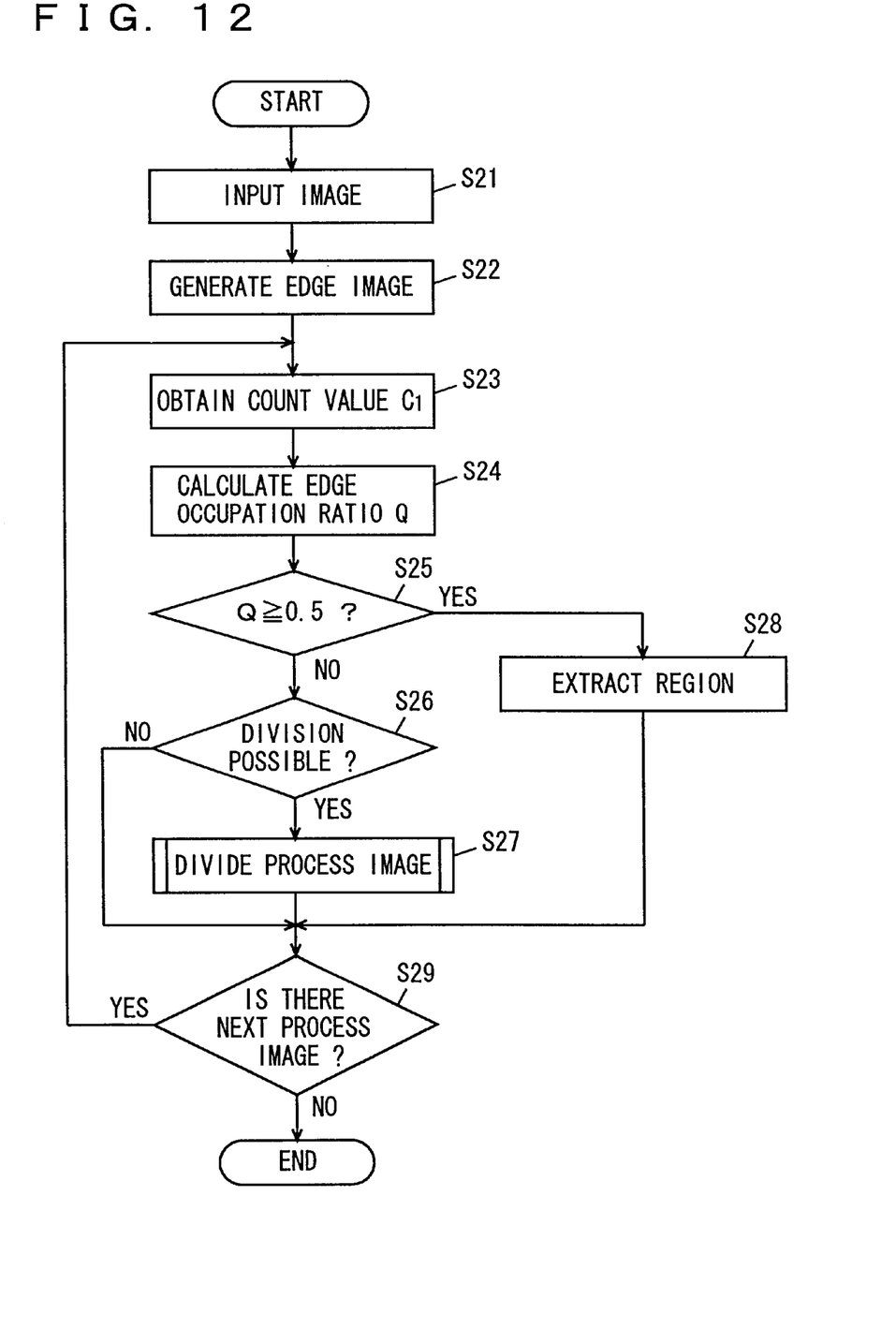
FIG. 12 is a flowchart showing a flow of an edge region extracting process in the second embodiment.

A process of extracting an edge region which is performed by the image processing device in this embodiment is described below. FIG. 12 is a flowchart showing flow of the edge region extracting process. Referring to FIG. 12, in the edge region extracting process, an image to be processed is input (S21). Edge image generating unit 201 extracts edge pixels from the input image (S22).

Pixel number counting unit 202 counts the number of edge pixels extracted in step S22 which are included in the image to be processed (process image) so as to obtain count value C1 (S23). The process image in step S23 may be an image which is first input to the image processing device or one of images into which an image is divided by region dividing unit 110. When step S23 is performed for the first time, an image which is first input to the image processing device is to be processed (process image). From the second time onward, an image to be processed (process image) is one of images into which an image is divided by region dividing unit 110.

In step S24, the ratio of the edge pixels to the total number of pixels in the process image (hereinafter referred to as edge occupation ratio Q) is determined based on count value C1 obtained in step S23. Edge occupation ratio Q is calculated according to an equation Q=C1/N where N represents the total number of pixels in the process image.

In step S25, decision is made as to whether edge occupation ratio Q is equal to or more than a predetermined threshold value (0.5) in order to determine if the process image should be extracted as a region to be extracted. If edge occupation ratio Q is at least the predetermined threshold, step S28 is performed and step S26 is performed if not. Here, the predetermined threshold value is 0.5. However, the threshold value is not limited to 0.5 and can be varied depending on the type of image to be processed.

In step S28, the process image is extracted as a region to be extracted. After step S28 , step S29 is performed.

If edge occupation ratio Q is smaller than the threshold value (NO in S25), whether or not the process image can be divided is decided (S26). This decision is based on whether the number of pixels on one side of the process image is greater than 4. If the number of pixels on one side of the process image is greater than 4, the image can be divided and step S27 is performed. If the number of pixels on one side of the process image is equal to or smaller than 4, the process image cannot be divided and then step S29 is conducted. Only a process image having more than 4 pixels on one side is decided as dividable in order to enhance the processing speed. For example, the size of a dividable process image may not be restricted and the image may be divided into regions of the pixel size. However, almost all regions including edge pixels can be extracted by dividing the process image into regions of a predetermined size.

In step S27, the process image is divided. This step is similar to step S06 in FIG. 4 and description thereof is not repeated here.

In step S29, whether there is an image to be processed (process image) is decided. If there is a process image, the process steps S23 to S28 are repeated for the process image. If not, the extracting process is completed.

As heretofore described, the image processing device in the second embodiment can accurately extract an edge region included in an image. For example, if an image is the one obtained by shooting a paper on which characters or the like are drawn, the character portion is extracted as edge pixels and accordingly only the region of characters can be extracted.

According to the first and second embodiments, the quad tree image segmentation method is employed for dividing a process image. However, the segmentation method is not limited thereto, and a process image may be divided evenly into six or eight regions, for example. Further, although the process image is rectangular in shape, the process image may be in any shape.

According to the first and second embodiments, the image processing device for extracting a region is described. However, the present invention is of course applicable to the method of extracting a region as shown in the flowcharts in FIGS. 4 and 5 or the flowchart in FIG. 12, or a recording medium on which a region extracting program for allowing a computer to execute the processing shown in these flowcharts is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A region extraction device comprising:
a segmentation unit to divide an input image into a plurality of regions;
a calculation unit to determine a ratio of pixels of a predetermined value to all pixels of each of said plurality of regions; and
an extraction unit to extract a region, among said plurality of regions, in which said ratio determined by said calculation unit exceeds a first value, wherein
said segmentation unit inputs a region as a new image among said plurality of regions which has said ratio of at most said first value, and
said segmentation unit does not input a region as a new image among said plurality of regions which has said ratio greater than a second value.

2. The region extraction device according to claim 1, wherein
said segmentation unit does not input a region as a new image among said plurality of regions which is smaller than a predetermined size.

3. The region extraction device according to claim 1, wherein
said segmentation unit divides an input image into four regions.

4. A region extraction device comprising:
a segmentation unit to divide an input image into a plurality of regions;
a calculation unit to determine a ratio of pixels of a predetermined value to all pixels of each of said plurality of regions; and an extraction unit to extract a region among said plurality of regions, in which said ratio determined by said calculation unit exceeds a first value, wherein said first value varies depending on size of said plurality of regions.

5. A method of extracting a region comprising the steps of:

dividing an input image into a plurality of regions;

determining a ratio of pixels of a predetermined value to all pixels of each of said plurality of regions; and extracting a region, among said plurality of regions, in which said ratio determined in said determining step exceeds a first value, wherein in said dividing step, a region is input as a new image among said plurality of regions which has said ratio of at most said first value, and in said dividing step, a region is not input as a new image among said plurality of regions which has said ratio greater than a second value.

6. The region extraction method according to claim 5, wherein in said dividing step, a region is not input as a new image among said plurality of regions which is smaller than a predetermined size.

7. The region extraction method according to claim 5, wherein in said dividing step, an input image is divided into four regions.

8. A method of extracting a region comprising the steps of:

dividing an input image into a plurality of regions;

determining a ratio of pixels of a predetermined value to all pixels of each of said plurality of regions; and extracting a region, among said plurality of regions, in which said ratio determined in said determining step exceeds a first value, wherein said first value varies depending on size of said plurality of regions.

9. A computer readable recording medium storing a region extraction program to allow a computer to execute the steps of:

dividing an input image into a plurality of regions;

determining a ratio of pixels of a predetermined value to all pixels of each of said plurality of regions; and extracting a region in which said ratio determined in said determining step exceeds a predetermined value, wherein in said dividing step, a region is input as a new image among said plurality of regions which has said ratio of at most said first value, and in said dividing step, a region is not input as a new image among said plurality of regions which has said ratio treater than a second value.

* * * * *